US012779759B2

(12) United States Patent
Oike et al.

(10) Patent No.: US 12,779,759 B2
(45) Date of Patent: Nov. 3, 2026

(54) RESIN CONTAINER MANUFACTURING METHOD, DIE UNIT, AND BLOW MOLDING DEVICE

(71) Applicant: NISSEI ASB MACHINE CO., LTD., Nagano (JP)

(72) Inventors: Toshiteru Oike, Nagano (JP); Yukihiro Ichihashi, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 152 days.

(21) Appl. No.: 18/019,157

(22) PCT Filed: Aug. 2, 2021

(86) PCT No.: PCT/JP2021/028666
§ 371 (c)(1),
(2) Date: May 1, 2023

(87) PCT Pub. No.: WO2022/030461
PCT Pub. Date: Feb. 10, 2022

(65) Prior Publication Data
US 2023/0321889 A1 Oct. 12, 2023

(30) Foreign Application Priority Data
Aug. 3, 2020 (JP) ................................. 2020-131764

(51) Int. Cl.
*B29C 49/06* (2006.01)
*B29C 45/16* (2006.01)
(Continued)

(52) U.S. Cl.
CPC .............. *B29C 49/06* (2013.01); *B29C 45/16* (2013.01); *B29C 45/26* (2013.01); *B29C 45/73* (2013.01);
(Continued)

(58) Field of Classification Search
CPC ......... B29C 49/22; B29C 49/06; B29C 45/26; B29C 45/73; B29C 45/16; B29L 2031/7158
See application file for complete search history.

(56) References Cited

U.S. PATENT DOCUMENTS 5,364,585 A 11/1994 Takeuchi
6,649,121 B1 11/2003 Hamamoto et al.
(Continued)

FOREIGN PATENT DOCUMENTS

JP 2931428 B2 8/1999
JP 2000-43126 A 2/2000
(Continued)

OTHER PUBLICATIONS

JP2000043126 English translation prepared Sep. 13, 2024 (Year: 2024).*
(Continued)

*Primary Examiner* — Alison L Hindenlang
*Assistant Examiner* — Shibin Liang
(74) *Attorney, Agent, or Firm* — GREENBLUM & BERNSTEIN, P.L.C.

(57) ABSTRACT

A method for manufacturing a resin container includes: injection-molding a first layer of a bottomed cylindrical preform from a first resin material as a first injection-molding; accommodating the first layer manufactured in the first injection-molding in a temperature adjustment mold, adjusting a temperature of the first layer, and forming an opening portion in a bottom portion of the first layer; injecting a second resin material from the opening portion to an inner peripheral side of the first layer to laminate a second layer on the inner peripheral side of the first layer, as a second injection-molding; and blow-molding a multilayer preform obtained in the second injection-molding in a state
(Continued)

where the multilayer preform includes residual heat from the injection molding to manufacture the resin container.

6 Claims, 8 Drawing Sheets

(51) Int. Cl.

| | |
|---|---|
| ***B29C 45/26*** | (2006.01) |
| ***B29C 45/73*** | (2006.01) |
| ***B29C 49/22*** | (2006.01) |
| ***B29C 49/48*** | (2006.01) |
| ***B29L 31/00*** | (2006.01) |

(52) U.S. Cl.
CPC .............. *B29C 49/22* (2013.01); *B29C 49/48* (2013.01); *B29L 2031/7158* (2013.01)

(56) References Cited

U.S. PATENT DOCUMENTS

| | | | | |
|---|---|---|---|---|
| 8,551,592 | B2 * | 10/2013 | Atance Orden | B29B 11/14 428/36.91 |
| 9,067,709 | B2 | 6/2015 | Furusawa | |
| 11,260,575 | B2 | 3/2022 | Kawamura et al. | |
| 2012/0189727 | A1 * | 7/2012 | Horigome | G06F 12/0811 425/538 |
| 2019/0337218 | A1 * | 11/2019 | Kawamura | B29C 49/48 |
| 2022/0055279 | A1 | 2/2022 | Oike et al. | |
| 2022/0143897 | A1 | 5/2022 | Kawamura et al. | |

FOREIGN PATENT DOCUMENTS

| | | | | |
|---|---|---|---|---|
| JP | 2000043126 | * | 2/2000 | B29C 49/06 |
| JP | 2001-105478 | A | 4/2001 | |
| JP | 2002-104362 | A | 4/2002 | |
| JP | 5267901 | B2 | 8/2013 | |
| JP | 2020-97229 | A | 6/2020 | |
| WO | 2020/138292 | A1 | 7/2020 | |

OTHER PUBLICATIONS

JP2000043126 English translation prepared Dec. 12, 2024 (Year: 2024).*

International Search Report issued in International Bureau of WIPO Patent Application No. PCT/JP2021/028666, dated Aug. 31, 2021, along with an English translation thereof.

Written Opinion issued in International Bureau of WIPO Patent Application No. PCT/JP2021/028666, dated Aug. 31, 2021, along with an English translation thereof.

* cited by examiner

RESIN CONTAINER MANUFACTURING METHOD, DIE UNIT, AND BLOW MOLDING DEVICE

BACKGROUND OF THE INVENTION

Field of the Invention

The present invention relates to a method for manufacturing a resin container, a mold unit, and a blow-molding apparatus.

Description of the Related Art

Conventionally, resin containers have been applied to various purposes, and various resin containers having a plurality of resin layers have been put to practical use. For example, there are known resin delamination containers having a two-layer structure of an inner layer and an outer layer, in which the inner layer is delaminated from the outer layer in accordance with discharge of contents. This type of delamination container is also called delamination bottle or airless bottle, and is used as a container of a seasoning liquid such as soy sauce, a skin lotion, a liquid detergent such as shampoo and hand soap, or a liquid chemical for disinfection and sterilization, for example.

At present, in the manufacture of this type of delamination container, the extrusion blow method is generally used, and the stretch blow method is rarely used (see Japanese Patent No. 5267901).

For example, from the viewpoint of improving the appearance, dimensional accuracy, physical property strength, and the like of a delamination container and reducing the environmental load by suppressing the use of unnecessary materials, it has been studied to apply a one-stage hot parison blow-molding method in which the injection-molding process to the blow molding process are continuously performed in the production of the delamination container.

However, when the delamination container is designed so as to meet all of demands in functional aspects such as moisture barrier properties and gas barrier properties, physical aspects such as buckling resistance (load resistance) and impact resistance (drop strength), and appearance design aspect, the melting point of the resin material for the outer layer may be set higher than the melting point of the resin material for the inner layer. In the injection-molding process of molding a preform having a two-layer structure, if a high-temperature resin material for the outer layer is charged after formation of the inner layer, the surface of the inner layer coming into contact with the resin material of the outer layer will be melted and thermally deformed. For this reason, it is extremely difficult to manufacture a delamination container by using a hot parison blow-molding method.

SUMMARY OF THE INVENTION

A method for manufacturing a resin container according to an aspect of the present invention includes: injection-molding a first layer of a bottomed cylindrical preform from a first resin material as a first injection-molding; accommodating the first layer manufactured in the first injection-molding in a temperature adjustment mold, adjusting a temperature of the first layer, and forming an opening portion in a bottom portion of the first layer; injecting a second resin material from the opening portion to an inner peripheral side of the first layer to laminate a second layer on the inner peripheral side of the first layer, as a second injection-molding; and blow-molding a multilayer preform obtained in the second injection-molding in a state where the multilayer preform includes residual heat from the injection molding to manufacture the resin container.

Further features of the present invention will become apparent from the following description of exemplary embodiments with reference to the attached drawings.

DESCRIPTION OF THE EMBODIMENTS

Figure 1:
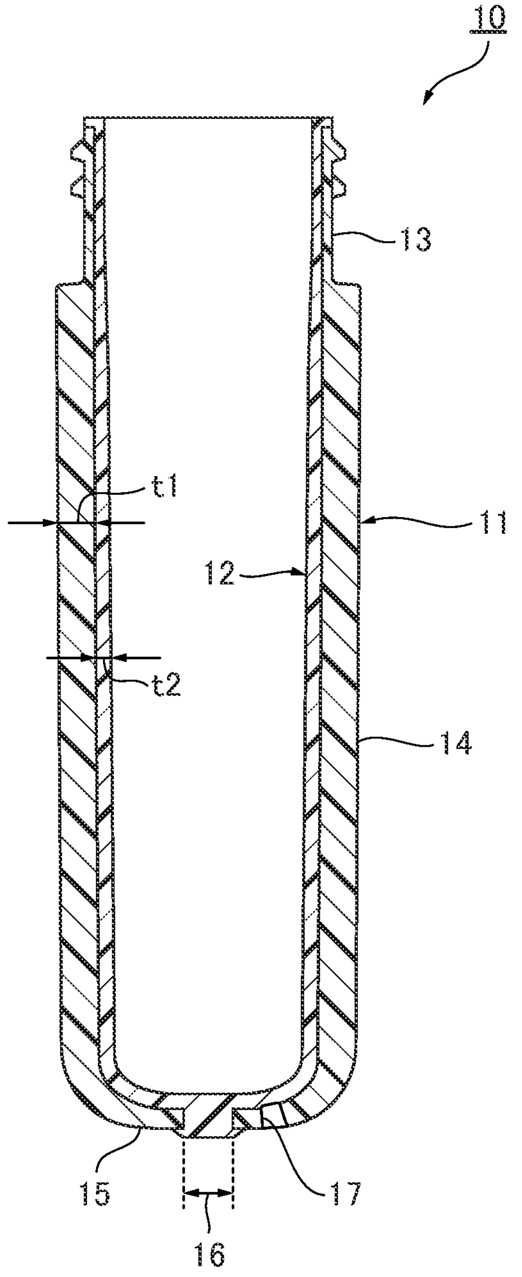
FIG. 1 is a longitudinal cross-sectional view of a preform having a multilayer structure of the present embodiment.

Hereinafter, embodiments of the present invention will be described with reference to the drawings. In the following embodiment, a case of manufacturing a delamination container will be described as an example of manufacturing a container by a hot parison blow-molding method using a preform having a multilayer structure.

In the embodiment, for easy understanding, description of structures and elements other than the main parts of the present invention will be simplified or omitted. In the drawings, the same elements are denoted by the same reference numerals. The shapes, dimensions, and the like of the respective elements in the drawings are schematically illustrated, and do not indicate actual shapes, dimensions, and the like.

<Configuration Example of Preform>

First, a configuration example of a preform for a delamination container according to the present embodiment will be described with reference to FIG. 1. FIG. 1 is a longitudinal cross-sectional view of a preform 10 of the present embodiment. The entire shape of the preform 10 is a bottomed cylindrical shape in which one end side is opened and the other end side is closed. The preform 10 includes a body portion 14 formed in a cylindrical shape, a bottom portion 15 that closes the other end side of the body portion 14, and a neck portion 13 formed in an opening at one end side of the body portion 14.

The preform 10 has a two-layer structure in which a second layer (inner layer) 12 is laminated inside a first layer (outer layer) 11. The first layer 11 and the second layer 12 are formed of different thermoplastic resin materials by two-stage injection molding as described later. The first layer 11 is made of a synthetic resin that is excellent in moldability and transparency and is capable of imparting buckling resistance and impact resistance required for the container. On the other hand, the second layer 12 is made of a synthetic resin that has properties contributing to stable storage of the contents of the container and suppression of deterioration (oxidation) of the contents (for example, moisture barrier property, gas barrier property, heat resistance, and chemical resistance). The resin material of the first layer 11 is selected to be higher in melting point than the resin material of the second layer 12. The first layer 11 may also have properties that contribute to stable storage of the contents and suppression of deterioration of the contents. Furthermore, the first layer 11 and the second layer 12 may have different properties. For example, the first layer 11 may be made of a material having a moisture barrier property, and the second layer 12 may be made of a material having a gas barrier property. Further, the first layer 11 and the second layer 12 may be made of the same kind of synthetic resin (The resin materials of the first layer 11 and second layer 12 may have the same melting point). In this case, at least one of the first layer 11 and the second layer 12 preferably contains an additive that contributes to stable storage of the contents and suppression of deterioration (oxidation) of the contents.

Hereinafter, the resin material of the first layer 11 will also be called first resin material, and the resin material of the second layer 12 will also be called second resin material.

The combination of the first resin material and second resin material can be appropriately selected according to the specification of the delamination container. Specific examples of the material include polyethylene terephthalate (PET), polyethylene naphthalate (PEN), polycyclohexanedimethylene terephthalate (PCTA), Tritan ((registered trademark): co-polyester manufactured by Eastman Chemical Co., Ltd.), polypropylene (PP), polyethylene (PE), polycarbonate (PC), polyethersulfone (PES), polyphenylsulfone (PPSU), polystyrene (PS), cyclic olefin polymer (COP/COC), polymethyl methacrylate: acrylic (PMMA), polylactic acid (PLA), and the like.

As an example, the first resin material is polyethylene terephthalate (PET), and the second resin material is polypropylene (PP). The melting point of PP is about 160 to 170° C., and the melting point of PET is higher than the melting point of PP and is about 245 to 260° C.

In the body portion 14 of the preform 10, the ratio (t1/t2) of a thickness t1 of the first layer 11 to a thickness t2 of the second layer 12 is preferably 1.5 or more. The thickness ratio is preferably 3.0 or less from the viewpoint of ensuring the transparency of the delamination container to be molded.

In the bottom portion 15 of the preform 10, an opening portion 16 is formed through the first layer 11 at the center of the bottom portion of the first layer 11. The opening portion 16 of the first layer 11 is closed from the inside by the second layer 12. In the preform 10, an exposed portion of the second layer 12 is formed outside the opening portion 16. The diameter of the exposed portion is made larger than the diameter of the opening portion 16.

A concave portion 17 is formed in the bottom portion 15 of the preform 10 for forming an air introduction hole in the delamination container. The concave portion 17 has a circular shape, for example, and is formed at least at one position spaced apart in the radial direction from the center of the bottom portion 15 of the preform 10. Alternatively, a plurality of concave portions 17 may be formed along the circumferential direction. The depth of the concave portion 17 in the thickness direction of the container is set to a dimension in which at least the concave portion 17 penetrates the first layer 11 to expose the surface of the second layer 12 in the concave portion 17.

<Configuration Example of Delamination Container>

Figure 2:
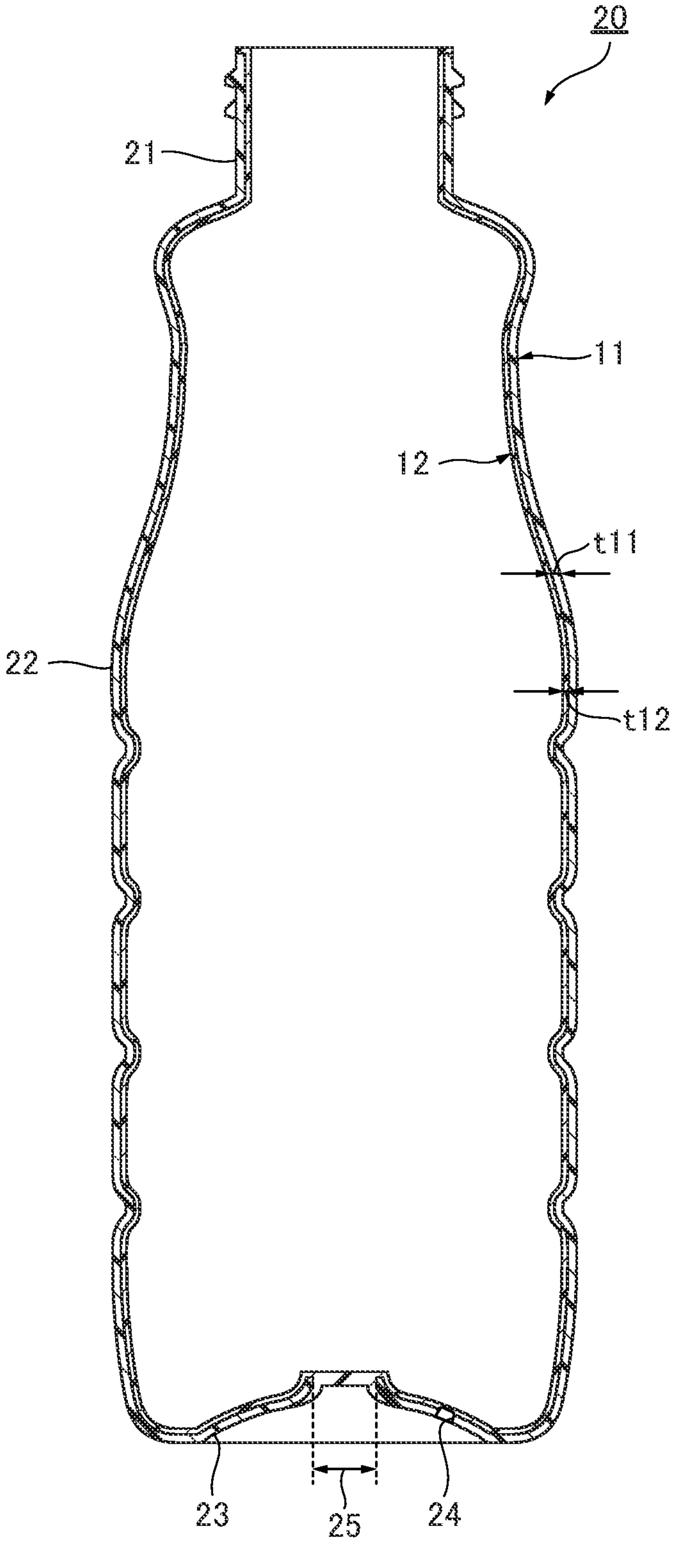
FIG. 2 is a diagram that illustrates an example of a resin container of the present embodiment.

Next, a configuration example of the delamination container 20 made of resin according to the present embodiment will be described with reference to FIG. 2. FIG. 2 is a longitudinal cross-sectional view of the delamination container 20 of the present embodiment.

The delamination container 20 is a bottle shaped resin container obtained by stretching and blow-molding the preform 10, and accommodates a seasoning liquid such as soy sauce, for example. The delamination container 20 may be used to accommodate another content such as a cosmetic liquid, a shampoo (liquid detergent), or a disinfecting/disinfecting liquid (chemical).

Similarly to the preform 10, the delamination container 20 has a two-layer structure in which a second layer 12 is laminated inside a first layer 11. In the body portion 22 of the delamination container 20, the ratio (t11/t12) of a thickness t12 of the first layer 11 to a thickness t11 of the second layer 12 is substantially similar to the ratio (t1/t2) of the thickness in the body portion 14 of the preform 10.

The delamination container 20 includes a neck portion 21 having an opening at an upper end, a cylindrical body portion 22 continuous from the neck portion 21, and a bottom portion 23 continuous from the body portion 22. In the manufacture of the delamination container 20, the body portion 14 and bottom portion 15 of the preform 10 are expanded by stretching and blowing and are shaped into the body portion 22 and bottom portion 23 of the delamination container 20. At the time of stretching and blowing, the concave portion 17 of the preform 10 is stretched to form an air introduction hole 24 penetrating the first layer 11 in the bottom portion 23 of the delamination container 20. A plug (not illustrated) is engaged with the neck portion 21 in an airtight state. The plug includes a push-type pump mechanism or a discharge mechanism that blocks/suppresses inflow of outside air. Since the plug is engaged with the neck portion 21, the inflow of outside air from the neck portion 21 to the body portion 22 is suppressed other than at the time of discharging the contents, so that deterioration (oxidation) of the contents can be suppressed. Furthermore, the plug prevents outside air from flowing from the neck portion 21 into between the first layer 11 and the second layer 12.

In the delamination container 20, the space inside the second layer 12 is filled with the contents. In the delamination container 20, as the contents are discharged from the second layer 12, the air gradually flows into between the first layer 11 and the second layer 12 through the air introduction hole 24, and the first layer 11 and the second layer 12 become delaminated. Accordingly, the volume of the container occupied by the contents can be replaced with the air without bringing the contents inside the second layer 12 into contact with the air, and the contents inside the second layer 12 can be discharged to the outside of the container. Furthermore, in the delamination container 20, the volume inside the second layer 12 automatically decreases according to the consumption of the contents, and as the contents become low, the contents can be collected on the pump mechanism or discharge mechanism side of the plug. Therefore, in the delamination container 20, the remaining amount of the contents that cannot be discharged can be minimized.

Similarly to the preform 10, an opening portion 25 (non-laminated portion 25, single layer portion 25) penetrating the first layer 11 is formed at the center of the bottom portion 23 of the delamination container 20. The opening portion 25 is filled with the material of the second layer 12 to close the opening portion 25, and the second layer 12 is exposed outside of the first layer 11 in the vicinity of the opening portion 25 of the bottom portion 23 of the delamination container 20. The exposed portion (bulging portion) of the second layer 12 protrudes outward in the radial direction, and is formed to be larger than the diameter of the opening portion 25. The exposed portion of the delamination container 20 is formed by stretching the exposed portion of the preform 10. Since the second layer 12 is exposed to the outside of the first layer 11 at the opening portion 25 of the delamination container 20, the second layer 12 is partially fixed (locked) to the first layer 11, and the displacement of the second layer 12 from the first layer 11 is suppressed.

<Description of Manufacturing Apparatus for Delamination Container>

Figure 3:
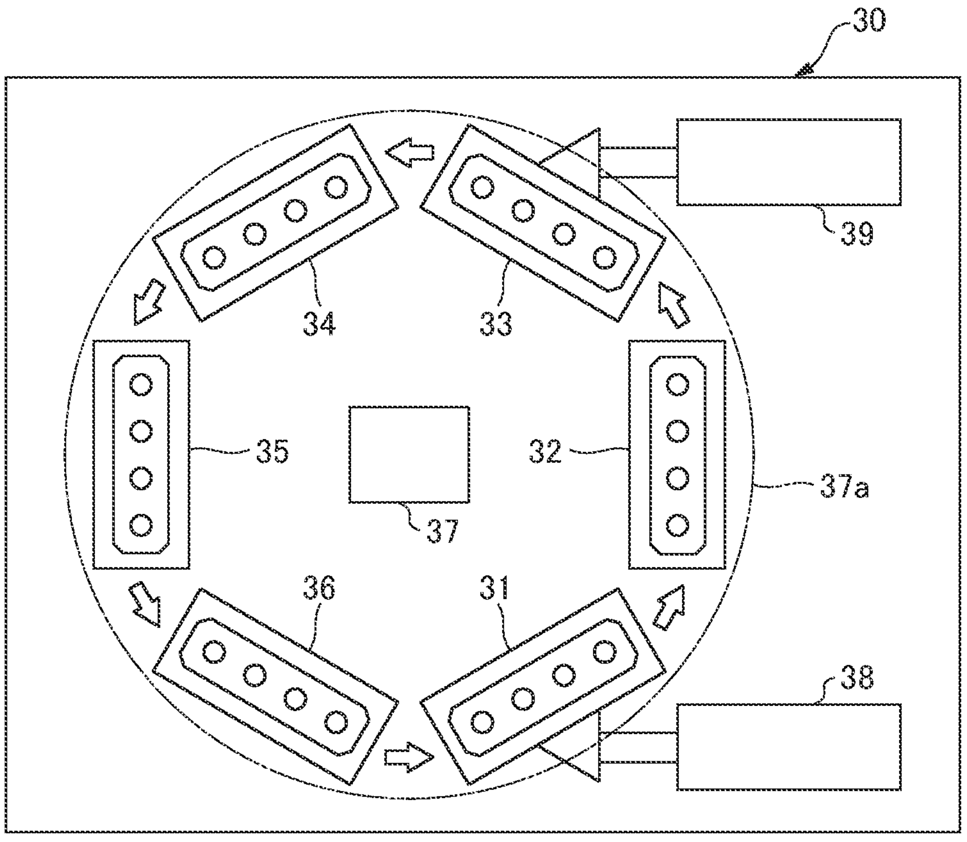
FIG. 3 is a diagram that schematically illustrates a configuration of a blow-molding apparatus according to the present embodiment.

FIG. 3 is a diagram that schematically illustrates a configuration of a blow-molding apparatus according to the present embodiment. A blow-molding apparatus 30 of the present embodiment is an example of an apparatus for manufacturing a container, and employs a hot parison method (also referred to as one-stage method or one-step method) in which the delamination container 20 is blow-molded by utilizing residual heat (internal heat quantity) resulting from the injection molding without cooling the preform 10 to room temperature.

The blow-molding apparatus 30 includes a first injection-molding unit 31, a first temperature adjustment unit 32, a second injection-molding unit 33, a second temperature adjustment unit 34, a blow-molding unit 35, a taking-out unit 36, and a conveyance mechanism 37. The first injection-molding unit 31, the first temperature adjustment unit 32, the second injection-molding unit 33, the second temperature adjustment unit 34, the blow-molding unit 35, and the taking-out unit 36 are arranged at positions rotated by a predetermined angle (for example, 60 degrees) about the conveyance mechanism 37.

(Conveyance Mechanism 37)

The conveyance mechanism 37 includes a rotary plate (transfer plate) 37*a* that rotates about an axis in a direction perpendicular to the sheet plane of FIG. 3. One or more neck molds 37*b* (not illustrated in FIG. 3) for holding the neck portion 13 of the preform 10 (or the neck portion 21 of the delamination container 20) are arranged on the rotary plate 37*a* at predetermined angles. The conveyance mechanism 37 rotates the rotary plate 37*a* to convey the preform 10 (or the delamination container 20) held by the neck mold 37*b* to the first injection-molding unit 31, the first temperature adjustment unit 32, the second injection-molding unit 33, the second temperature adjustment unit 34, the blow-molding unit 35, and the taking-out unit 36 in this order. The conveyance mechanism 37 can also move up and down the rotary plate 37*a*, and also performs operations related to mold closing and mold opening (releasing) in the first injection-molding unit 31 and the second injection-molding unit 33.

(First Injection-Molding Unit 31)

The first injection-molding unit 31 includes a cavity mold 40, a core mold 41, and a hot runner mold 42, and manufactures the first layer 11 of the preform 10 in cooperation with the neck mold 37*b* conveyed at the time of molding. The cavity mold 40 includes a first cavity mold 40A on the opening side (upper side) and a second cavity mold 40B on the bottom side (lower side). As illustrated in FIG. 3, a first injection device 38 is connected to the first injection-molding unit 31 to supply a first resin material to the hot runner mold 42. The cavity mold 40 and the hot runner mold 42 are fixed to a machine base of the blow-molding apparatus 30 in an integrated state. The core mold 41 is fixed to a core mold lifting and lowering mechanism.

The cavity mold 40 defines the shape of the outer periphery of the first layer 11. The first cavity mold 40A is a mold facing the opening side of the cavity mold 40, and defines the shape of the outer periphery of the body portion of the first layer 11. The second cavity mold 40B is a mold facing the bottom side of the cavity mold 40, and defines the shape of the outer periphery of the bottom portion of the first layer 11. The hot runner mold 42 includes a resin supply portion 42*a* that introduces the first resin material from the first injection device 38. The core mold 41 is a mold that defines the shape of the inner peripheral side of the first layer 11, and is inserted into the inner peripheral side of the cavity mold 40 from above. The neck mold 37*b* defines the outer shape of the neck portion 13 of the preform 10 (first layer 11). Although FIG. 4 illustrates an example in which the cavity mold 40 is divided into the first cavity mold 40A and the second cavity mold 40B, the cavity mold 40 may be integrally configured without being divided.

The hot runner mold 42 of the cavity mold 40 may internally include a valve pin (not illustrated) (a bar-shaped member that opens and closes the resin supply portion 42*a*) that is movable in the axial direction to a position close to the core mold 41. For example, the valve pin of the hot runner mold 42 is accommodated in the hot runner mold 42 until the mold space is filled with the first resin material, and then protrudes to a position closer to the core mold 41 than the bottom surface of the second cavity mold 40B after the mold space is filled with the first resin material.

Figure 4:
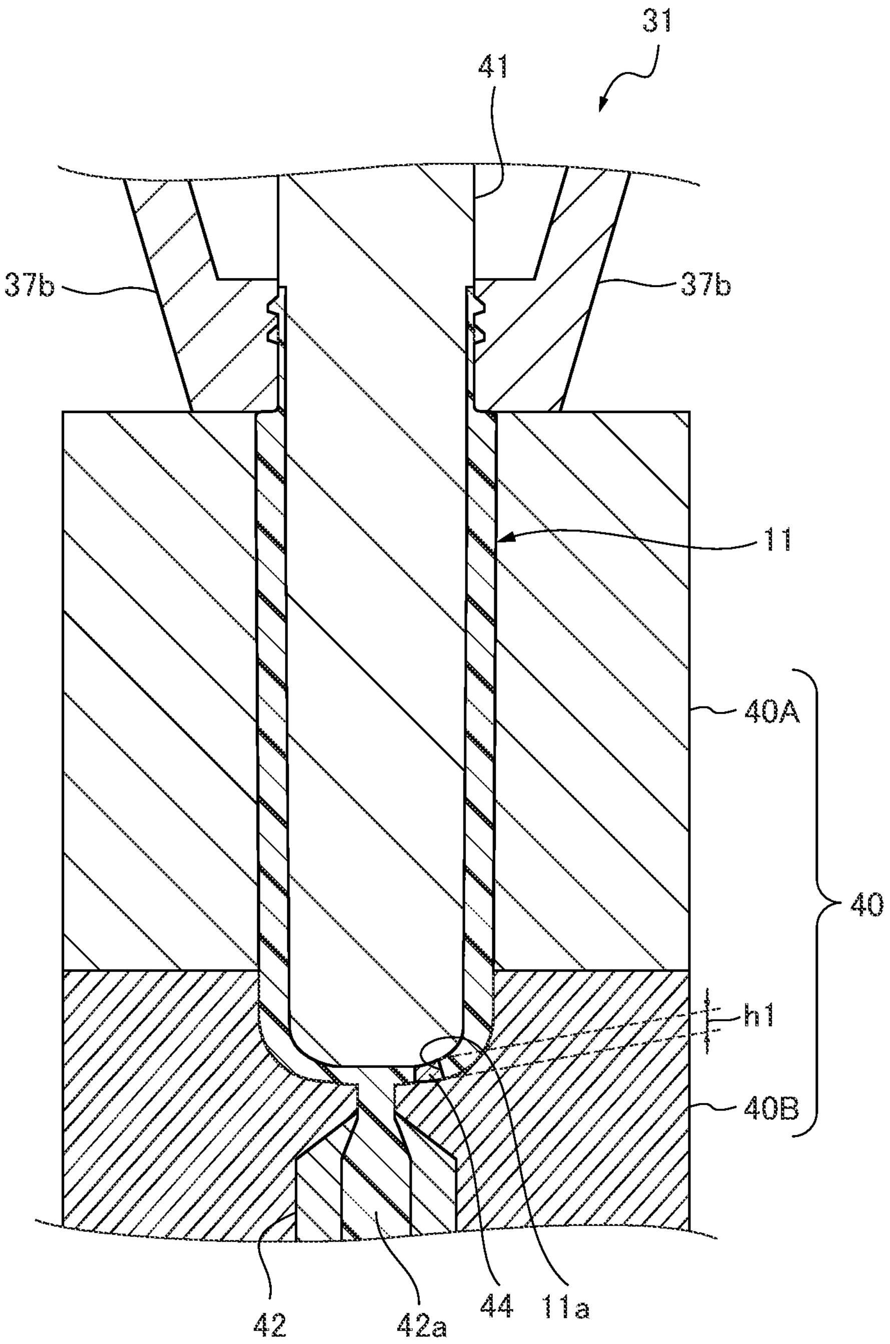
FIG. 4 is a diagram that illustrates a configuration example of a first injection-molding unit.

As illustrated in FIG. 4, in the first injection-molding unit 31, the cavity mold 40, the core mold 41, and the neck mold 37*b* of the conveyance mechanism 37 are closed to form a mold space of the first layer 11. Then, the first resin material is poured from the bottom portion of the mold space through the hot runner mold 42, whereby the first layer 11 of the preform 10 is manufactured in the first injection-molding unit 31. If the hot runner mold 42 has the valve pin described above, the valve pin may be raised after pouring the first resin material into the mold space of the first layer 11, and moved to a position closer to the core mold 41, protruding beyond the bottom surface of the second cavity mold 40B. As a result, since the center of the bottom portion of the first layer 11 can be formed into a thin film that is thinner than the peripheral portion, the opening portion 16 in the first temperature adjustment unit 32 described later can be formed more reliably.

A first projection portion 44 is provided at a predetermined position on the upper side of the second cavity mold 40B facing the outer periphery of the bottom portion of the first layer 11. For example, the first projection portion 44 has a cylindrical shape, a conical shape (tapered cylindrical shape), a prismatic shape, or a pyramidal shape. At least one first projection portion is spaced in the radial direction from the center of the bottom portion of the first projection portion 44 where the resin supply portion 42*a* is located.

The shape of the first projection portion 44 may be another shape such as a rib shape extending in the axial direction, or a plurality of the first projection portions 44 may be formed so as to be rotationally symmetric with respect to the center of the bottom portion, for example. The number of first projection portions 44 may be plural. In this case, each of the first projection portions 44 may be arranged in a point-symmetric positional relationship with respect to the central axis.

As illustrated in FIG. 4, a protrusion amount h1 of the first projection portion 44 from the outer peripheral surface of the bottom portion of the first layer 11 (or the cavity reference surface of the second cavity mold 40B) is substantially the same dimension as the thickness of the first layer 11. Therefore, when the molds of first injection-molding unit 31 are closed, the tip of the first projection portion 44 faces the surface of the core mold 41 (that is, the tip of the first projection portion 44 is located in the vicinity of the surface of the core mold 41). As a result, in the injection molding of the first injection-molding unit 31, the first projection portion 44 forms a concave portion 11*a* of a circular shape or the like is formed in the first layer 11 at a position corresponding to the concave portion 17 of the preform 10. The concave portion 11*a* of the first layer 11 may penetrate the first layer 11, or may have a thin film between the core mold 41 and the first projection portion 44.

When the molds of the first injection-molding unit 31 are opened, the neck mold 37*b* of the conveyance mechanism 37 is not opened but is conveyed with the first layer 11 of the preform 10 held. The number of the preforms 10 simultaneously molded by the first injection-molding unit 31 (that is, the number of the delamination containers 20 that can be simultaneously molded by the blow-molding apparatus 30) can be appropriately set. FIG. 3 illustrates a configuration in which four preforms are simultaneously conveyed.

(First Temperature Adjustment Unit 32)

The first temperature adjustment unit 32 includes either a mold unit 50*a* of a first example or a mold unit 50*b* of a second example to be described later. The first temperature adjustment unit 32 adjusts the temperature of the first layer 11 of the preform 10 having residual heat from the injection molding (in a high temperature state) by accommodating in the mold units 50*a* and 50*b* kept at a predetermined temperature (the first layer 11 is heated or cooled). The first temperature adjustment unit 32 also has a function of adjusting the temperature distribution of the first layer 11 of the preform 10 to a predetermined state before being conveyed to the second injection-molding unit 33.

When the first layer 11 of the preform 10 is accommodated in the mold units 50*a* and 50*b*, the first temperature adjustment unit 32 forms the opening portion 16 at the center of the bottom portion of the first layer 11.

Figure 5:
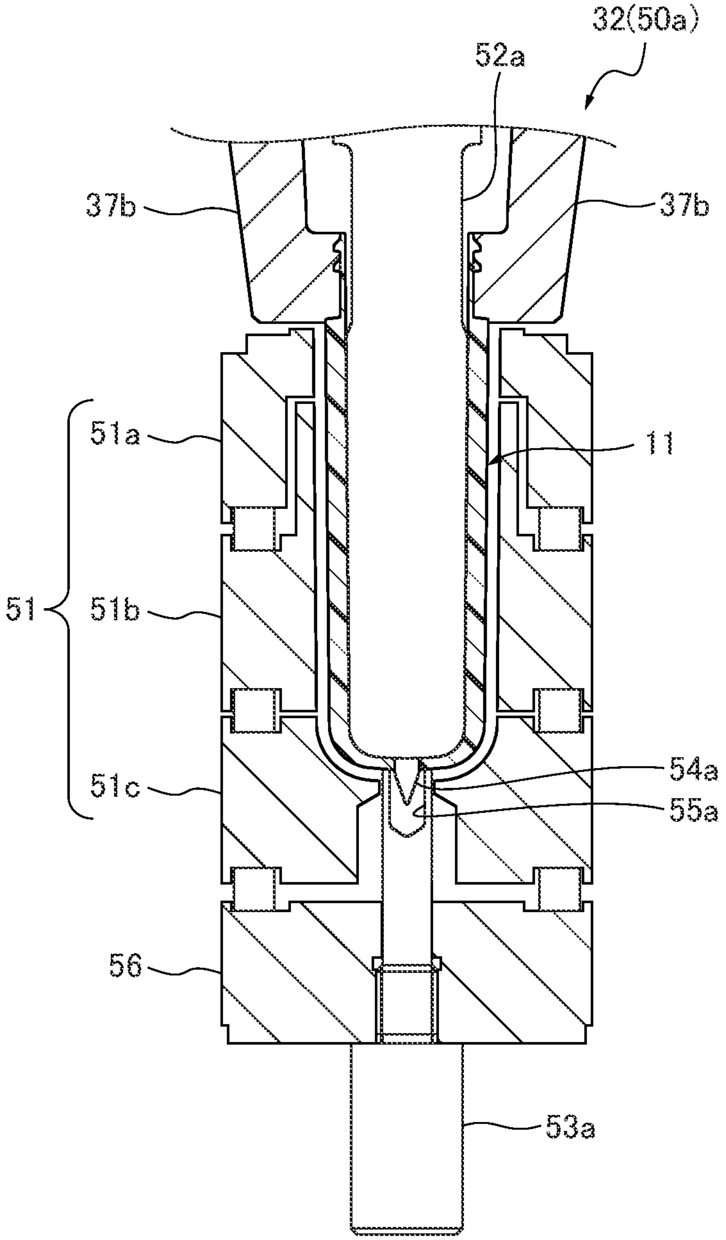
FIG. 5 is a diagram that illustrates a mold unit of a first example of a first temperature adjustment unit.

FIG. 5 is a diagram illustrating a mold unit 50*a* of a first example of the first temperature adjustment unit 32. The mold unit 50*a* of the first example includes a cavity mold (pot mold) 51, a core mold 52*a*, and a movable mold 53*a*.

The cavity mold 51 is a mold that has a temperature adjustment space capable of accommodating the first layer 11 of the preform 10 manufactured by the first injection-molding unit 31. The cavity mold 51 is vertically divided into three stages along the axial direction of the preform 10, and includes an upper mold 51*a*, a middle mold 51*b*, and a lower mold 51*c* in order from the top. The lower mold 51*c* of the cavity mold 51 is placed on a support base 56. A space through which the movable mold 53*a* is inserted is formed along the axial direction in the center of the bottom portion of the lower mold 51*c* facing the bottom portion 15 of the preform 10 and the support base 56.

A heater is provided or a flow path (not illustrated) through which a temperature adjustment medium (cooling medium) flows is formed in each of the upper mold 51*a*, the middle mold 51*b*, and the lower mold 51*c*. Therefore, the temperature of the cavity mold 51 is maintained at a predetermined temperature by the heaters or the temperature adjustment media. The temperature distribution of the preform 10 may be changed in the axial direction by changing the temperatures of the heaters or the temperature adjustment media in the upper mold 51*a*, the middle mold 51*b*, and the lower mold 51*c*. The cavity mold provided with the heater heats the preform 10 in a non-contact manner, and the cavity mold provided with the flow path of the temperature adjustment medium contacts the preform 10 to perform temperature adjustment or cooling.

The core mold 52*a* is a mold movable in the axial direction with respect to the cavity mold 51, and is inserted into the first layer 11 accommodated in the cavity mold 51. A flow path (temperature adjustment member or cooling member (not illustrated)) through which a temperature adjustment medium (cooling medium) flows is formed or incorporated inside the core mold 52*a*. The core mold 52*a* is maintained at a predetermined temperature by the temperature adjustment medium. The core mold 52*a* is formed in a shape corresponding to the inner peripheral surface of the first layer 11. Therefore, when the core mold 52*a* is inserted into the first layer 11, the inner peripheral surface of the first layer comes into surface contact with the surface of the core mold 52*a* to perform efficient heat exchange between these surfaces.

A conical perforating portion (punching needle) 54 protruding downward in the axial direction is provided at the center of tip of the core mold 52*a* facing the bottom portion 15 of the first layer 11. The perforating portion 54 penetrates the bottom portion of the first layer 11 when the core mold 52*a* is inserted into the first layer 11, and has a function of forming the opening portion 16 at the center of the bottom portion of the first layer 11.

The movable mold 53*a* is a mold facing the center of bottom portion of the first layer 11 from below, and is inserted into the lower mold 51*c* and the support base 56 so as to be movable up and down. A concave portion 55*a* corresponding to the shape of the perforating portion 54 of the core mold 52*a* and receiving the perforating portion 54 when the mold is closed is formed on the surface of the movable mold 53*a*.

Next, a configuration of a mold unit 50*b* of a second example will be described with reference to FIG. 6. In the description of the mold unit 50*b* of the second example, the same components as those of the metal mold unit 50*a* of the first example are denoted by the same reference numerals, and redundant description thereof will be omitted.

The mold unit 50*b* of the second example includes a cavity mold (pot mold) 51, a core mold 52*b*, and a movable mold 53*b*.

The core mold 52*b* of the mold unit 50*b* of the second example is a mold movable in the axial direction with respect to the cavity mold 51, and is inserted into a first layer 11 accommodated in the cavity mold 51. A flow path (not illustrated) through which a temperature adjustment medium (cooling medium) flows is formed or incorporated inside the core mold 52*b*. The core mold 52*b* is maintained at a predetermined temperature by the temperature adjustment medium. The core mold 52*b* is formed in a shape corresponding to the inner peripheral surface of the first layer 11. Therefore, when the core mold 52*b* is inserted into the first layer 11, the inner peripheral surface of the first layer comes into surface contact with the surface of the core mold 52*b* to perform efficient heat exchange between these surfaces.

In addition, a concave portion 55*b* that corresponds to the shape of a perforating portion 54*b* described later provided in a movable mold 53*b* and receives the perforating portion 54*b* when the mold is closed is formed at the center of the tip of a core mold 52*b* facing a bottom portion 15 of the first layer 11.

The movable mold 53*b* is a mold facing the center of bottom portion of the first layer 11 from below, and is inserted into the lower mold 51*c* and the support base 56 so as to be movable up and down. The movable mold 53*b* is provided with the conical perforating portion 54*b* (punching needle) axially protruding upward. When the movable mold 53*b* is raised and the mold is closed, the perforating portion

54*b* penetrates the bottom portion 15 of the first layer 11 in a state where the core mold 52*b* is inserted, and has a function of forming an opening portion 16 at the center of bottom portion of the first layer 11.

Figure 6:
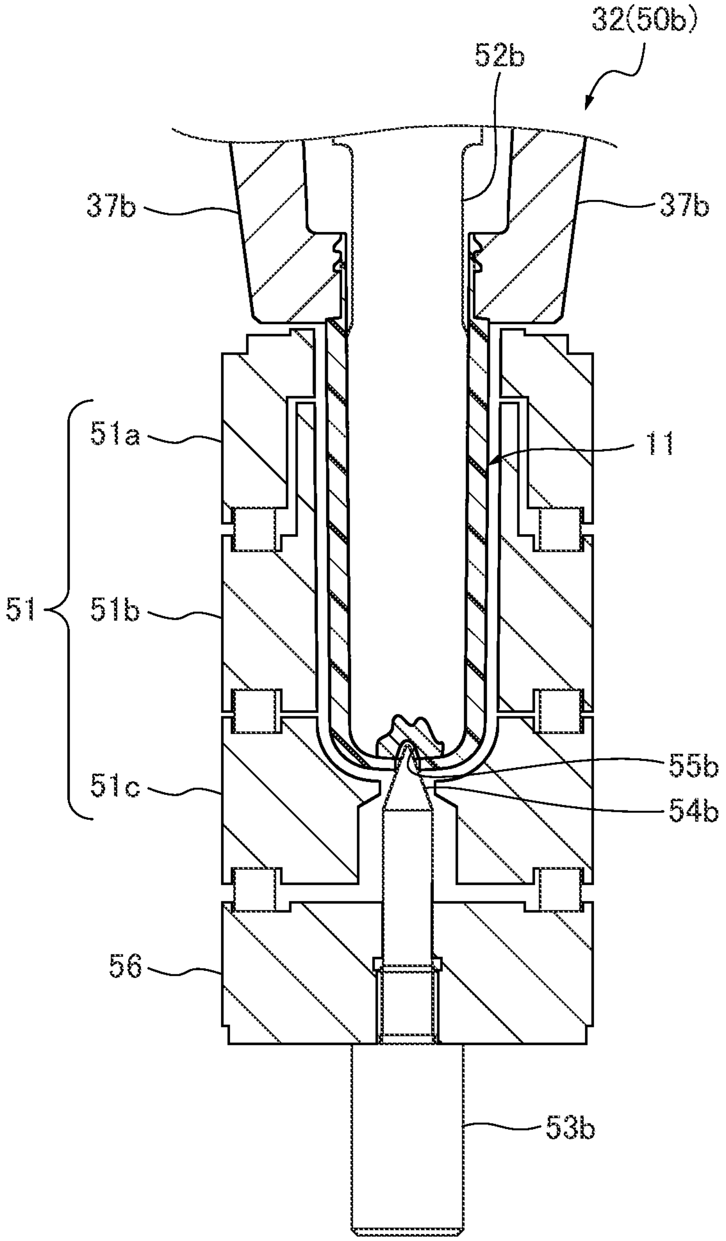
FIG. 6 is a diagram that illustrates a mold unit of a second example of the first temperature adjustment unit.

In addition, the mold units 50*a* and 50*b* illustrated in FIGS. 5 and 6 cool the first layer 11 from the inside by bringing the core molds 52*a* and 52*b* through which the temperature adjustment media flow into contact while heating the first layer 11 from the outside by emitted heat (radiant heat) from the cavity mold 51.

In the second injection-molding unit 33, as described later, the outside of the first layer 11 is cooled by contact with the cavity mold 60, and the temperature decreases. Therefore, in order to suppress the preform 10 from being less likely to swell at the time of blow molding, it is preferable that the first layer 11 is heated from the outside in the first temperature adjustment unit 32 to secure the residual heat.

In the second injection-molding unit 33, since the inside of the first layer 11 is heated with the second resin material as described later, whitening of the first layer 11 is likely to occur. Therefore, in the first temperature adjustment unit 32, it is preferable to cool the first layer 11 from the inside to suppress cloudiness (crystallization) of the first layer 11.

(Second Injection-Molding Unit 33)

Figure 7:
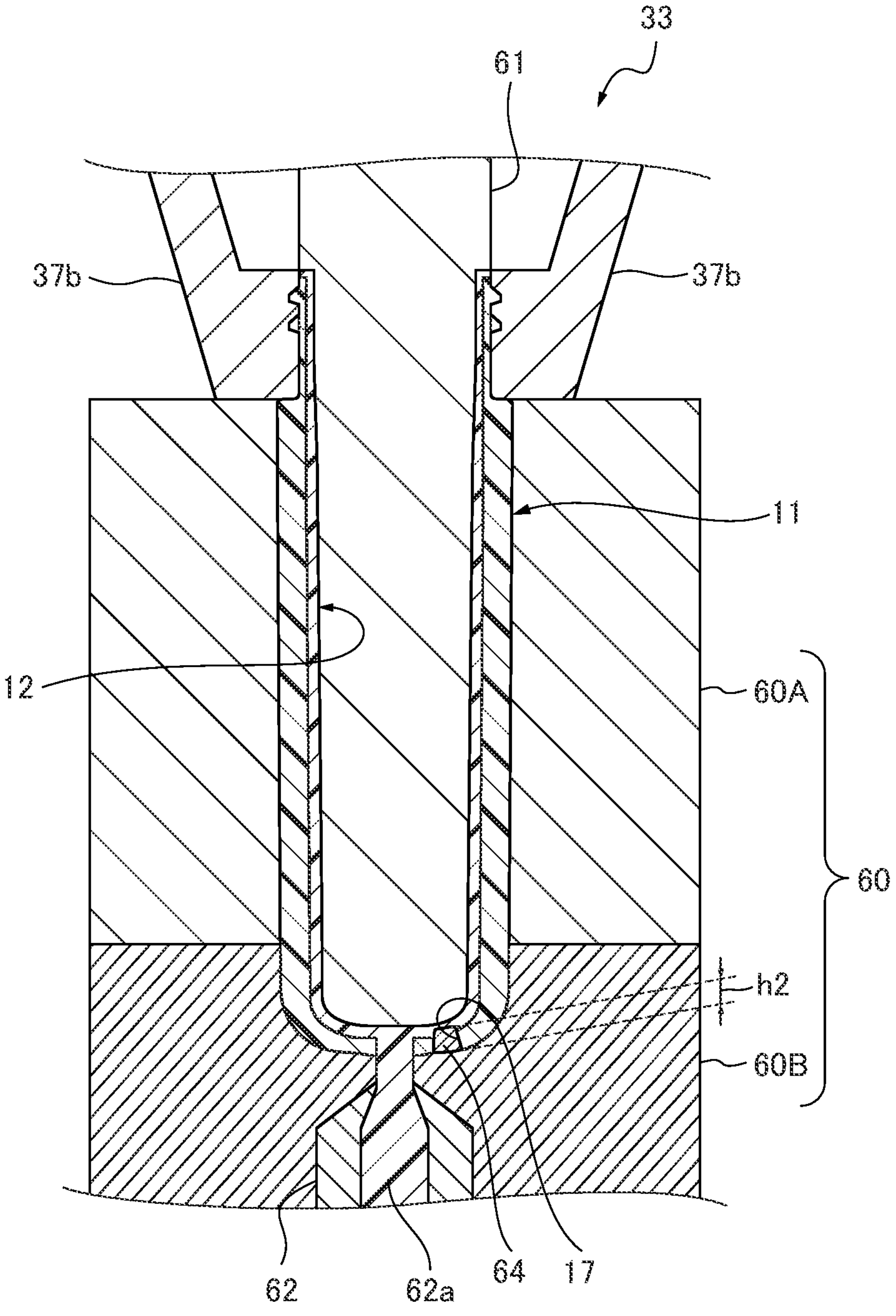
FIG. 7 is a diagram that illustrates a configuration example of a second injection-molding unit.

As illustrated in FIG. 7, the second injection-molding unit 33 includes a cavity mold 60, a core mold 61, and a hot runner mold 62, and performs injection molding of the second layer 12 on the inner peripheral portion of the first layer 11 in cooperation with the neck mold 37*b* conveyed at the time of molding. The cavity mold 60 includes a first cavity mold 60A on the opening side (upper side) and a second cavity mold 60B on the bottom side (lower side). As illustrated in FIG. 3, a second injection device 39 is connected to the second injection-molding unit 33 to supply the second resin material to the hot runner mold 62.

The cavity mold 60 is a mold that accommodates the first layer 11. The first cavity mold 60A is a mold facing the opening side of the cavity mold 60, and accommodates the body portion 14 of the first layer 11. The second cavity mold 60B is a mold facing the bottom side of the cavity mold 60, and accommodates the bottom portion 15 of the first layer 11. The hot runner mold 62 includes a resin supply portion 62*a* that introduces the second resin material from the second injection device 39. The core mold 61 is a mold that defines the shape of the inner peripheral side of the second layer 12, and is inserted into the inner peripheral side of the cavity mold 60 from above. The neck mold 37*b* defines the upper shape of the neck portion 13 of the preform 10 (second layer 12). In the cavity mold 60, the first cavity mold 60A and the second cavity mold 60B may be integrally formed without being divided.

As illustrated in FIG. 7, the second injection-molding unit 33 accommodates the first layer 11 of the preform 10 injection-molded by the first injection-molding unit 31. In a state where the molds of second injection-molding unit 33 are closed, a mold space is formed between the inner peripheral side of the first layer 11 and the surface of the core mold 61. In the second injection-molding unit 33, the second resin material is poured from the bottom portion of the mold space through the hot runner mold 62 to form the preform 10 in which the second layer 12 is laminated on the inner peripheral side of the first layer 11.

In addition, on the upper side of the second cavity mold 60B facing the outer periphery of the bottom portion of the first layer 11, a second projection portion 64 having a columnar shape or the like corresponding to the shape of the concave portion 17 of the preform 10 is provided at a predetermined position corresponding to the first projection portion 44 of the first injection-molding unit 31. The second projection portion 64 is inserted into the concave portion 11*a* of the first layer 11 when the first layer 11 is accommodated in the second injection-molding unit 33.

As illustrated in FIG. 7, a protrusion amount h2 of the second projection portion 64 from the outer peripheral surface of the bottom portion of the first layer 11 (or the cavity reference surface of the second cavity mold 60B) is larger than the thickness of the first layer 11. That is, the protrusion amount h2 of the second projection portion 64 is larger than the protrusion amount h1 of the first projection portion 44 (h2>h1). Therefore, when the molds of second injection-molding unit 33 are closed, the tip of the second projection portion 64 penetrates the concave portion 11*a* of the first layer 11 and protrudes to the inner peripheral side of the first layer 11. Providing the second projection portion 64 in the second cavity mold 60B of the second injection-molding unit 33 makes it possible to form the concave portion 17 in the bottom portion 15 of the preform 10.

The protrusion amount h2 of the second projection portion 64 is set to be smaller than the thickness of the preform 10. That is, in the injection molding in the second injection-molding unit 33, the second resin material flows into between the core mold 61 and the second projection portion 64, so that a hole penetrating the second layer 12 is not formed due to the second projection portion 64.

In the second injection-molding unit 33, the axial depth of the mold space in the cavity mold 60 accommodating the first layer 11 may be made shorter than the axial length of the first layer 11. Accordingly, when the first layer 11 is accommodated in the cavity mold 60, the bottom portion of the first layer 11 is pressed against the bottom surface of the cavity mold 60, and the first layer 11 and the cavity mold 60 come into contact with each other. This makes it possible to suppress generation of a gap between the bottom portion of the first layer 11 and the cavity mold 60. In addition, a concave molding space may be provided in the central region of bottom portion of the second cavity mold 60B so that the second layer 12 can be exposed from the opening portion 16 of the first layer 11, and a slight gap may be formed between the first layer 11 and the second cavity mold 60B in the central region of the bottom portion.

(Second Temperature Adjustment Unit 34)

The second temperature adjustment unit 34 performs temperature equalization or removal of uneven temperature of the preform 10 manufactured by the second injection-molding unit 33, and adjusts the temperature of the preform 10 to a temperature suitable for final blowing (for example, about 90° C. to 105° C.). The second temperature adjustment unit 34 also has a function of cooling the preform 10 in a high temperature state after injection molding. The second temperature adjustment unit 34 may have a function of heating the preform 10.

(Blow-Molding Unit 35)

The blow-molding unit 35 blow-molds the preform 10 whose temperature has been adjusted by the second temperature adjustment unit 34 to manufacture the delamination container 20.

The blow-molding unit 35 includes a blow cavity mold which is a pair of split molds corresponding to the shape of the delamination container 20, a bottom mold, a stretching rod, and an air introduction member (all not illustrated). The blow-molding unit 35 blow-molds the preform 10 while stretching the preform. As a result, the preform 10 is shaped into a shape of blow-cavity mold, so that the delamination container 20 can be manufactured.

(Taking-Out Unit 36)

The taking-out unit 36 is configured to open the neck portion 21 of the delamination container 20 manufactured by the blow-molding unit 35 from the neck mold 37*b* and extract the delamination container 20 from the blow-molding apparatus 30.

<Description of Method for Manufacturing Container>

Figure 8:
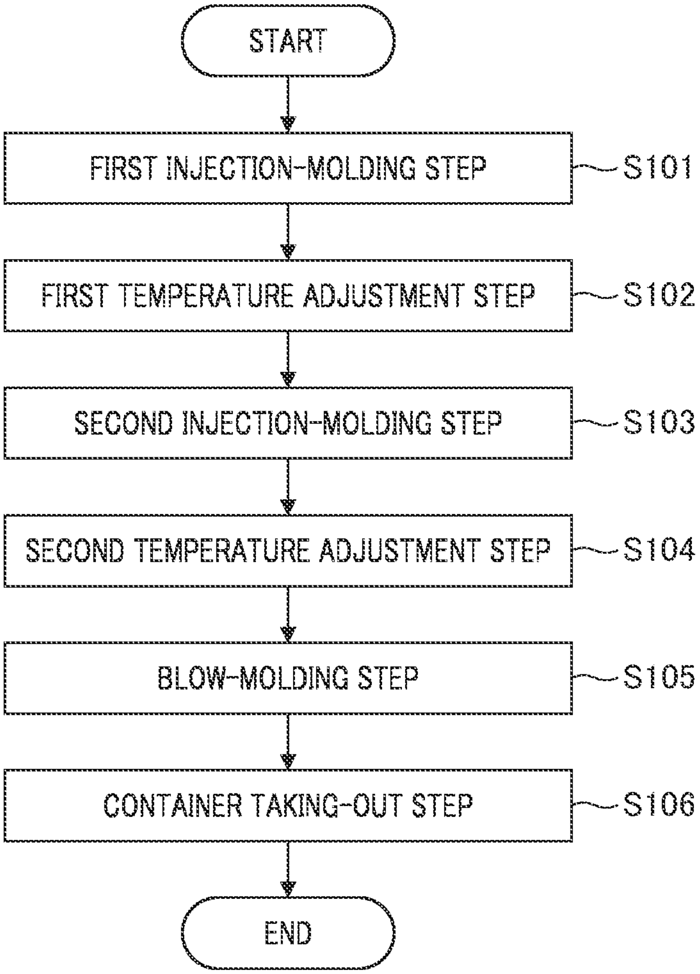
FIG. 8 is a flowchart that illustrates steps of a method for manufacturing a container.

Next, a method for manufacturing the delamination container 20 by the blow-molding apparatus 30 of the present embodiment will be described. FIG. 8 is a flowchart that illustrates steps of a method for manufacturing a container 20.

(Step S101: First Injection-Molding Step)

First, as illustrated in FIG. 4, in the first injection-molding unit 31, the first resin material is injected from the first injection device 38 into the mold space formed by the cavity mold 40, the core mold 41, and the neck mold 37*b* of the conveyance mechanism 37, thereby to mold the first layer 11 of the preform 10. At this time, the first projection portion 44 forms the concave portion 11*a* at the bottom portion of the first layer 11.

Thereafter, when the molds of first injection-molding unit 31 are opened, the rotary plate 37*a* of the conveyance mechanism 37 rotates by a predetermined angle, and the first layer 11 of the preform 10 held by the neck mold 37*b* is conveyed in a state that includes residual heat from the injection molding to the first temperature adjustment unit 32.

(Step S102: First Temperature Adjustment Step)

Next, in the first temperature adjustment unit 32, the first layer 11 of the preform 10 is accommodated in the mold unit 50*a* of the first example or the mold unit 50*b* of the second example, and the first layer 11 is cooled and adjusted in temperature distribution (temperature equalization or removal of uneven temperature).

In the case of using the mold unit 50*a* of the first example, when the core mold 52*a* is inserted inside the first layer 11, the perforating portion 54*a* provided at the tip of the core mold 52*a* comes into contact with the bottom portion 15 of the first layer 11. At this time, when the movable mold 53*a* is raised toward the first layer 11, the first layer 11 is pressed against the core mold 52*a*, so that the perforating portion 54*a* penetrates the bottom portion 15 of the first layer 11 to form the opening portion 16 at the center of the bottom portion of the first layer 11.

In the case of using the mold unit 50*b* of the second example, when the core mold 52*b* is inserted inside the first layer 11, the core mold 52*b* comes into contact with the inner surface of the bottom portion 15 of the first layer 11. At this time, when the movable mold 53*b* is raised toward the first layer 11, the perforating portion 54*a* of the movable mold 53*b* penetrates the bottom portion 15 of the first layer 11 to form the opening portion 16 at the center of the bottom portion of the first layer 11.

The first layer 11 in the first temperature adjustment unit 32 includes residual heat from the injection molding and is relatively easily deformed. Therefore, when the opening portion 16 is formed in the first layer 11, the first resin material at the center of the bottom portion of the first layer 11 is pushed away by the perforating portion 54*a* or 54*b* and integrated with the material around the opening portion 16. Therefore, in the present embodiment, no waste material is generated at the time of forming the opening portion 16.

Thereafter, the rotary plate 37*a* of the conveyance mechanism 37 rotates by a predetermined angle, and the first layer 11 of the preform 10 held by the neck mold 37*b* is conveyed to the second injection-molding unit 33.

(Step S103: Second Injection-Molding Step)

Subsequently, the first layer 11 of the preform 10 is accommodated in the second injection-molding unit 33, and injection molding of the second layer 12 is performed.

In the second injection-molding unit 33, as illustrated in FIG. 7, a mold space is formed between the inner peripheral side of the first layer 11 and the surface of the core mold 61 facing the inner periphery of the first layer 11, and the second resin material is charged into the mold space from the hot runner mold 62. During injection molding, the second resin material is guided from the opening portion 16 of the first layer 11 to the inner peripheral side of the first layer 11.

The temperature of the second resin material charged into the second injection-molding unit 33 is set to a temperature lower than the melting point of the first resin material. The surface temperature of the first layer 11 at the time of charging the second resin material into the second injection-molding unit 33 is cooled to a temperature equal to or lower than the melting point of the second resin material.

In the second injection-molding unit 33, the cavity mold 60 faces the outer peripheral side of the first layer 11, and the shape of the first layer 11 is held by the cavity mold 60 from the outer peripheral side. Therefore, even when the second resin material comes into contact with first layer 11, thermal deformation of first layer 11 can be suppressed.

In the second injection-molding unit 33, the second projection portion 64 penetrates and closes the concave portion 11*a* of the first layer 11, and thus the concave portion 17 of the preform 10 is not closed by the second resin material. Since the tip of the second projection portion 64 in the second injection-molding unit 33 protrudes to the inner peripheral side of the first layer, the concave portion 17 of the preform 10 formed by the second projection portion 64 has a shape that penetrates the first layer 11 and the surface of the second layer 12 is exposed in the concave portion 17.

In the second injection-molding unit 33, the axial depth of the mold space in the cavity mold 60 accommodating the first layer 11 is smaller than the axial length of the first layer 11. Therefore, the bottom portion 15 of the first layer 11 is pressed against the bottom surface of the cavity mold 60, and generation of a gap between the bottom portion 15 of the first layer 11 and the cavity mold 60 is suppressed. Therefore, the second resin material hardly flows into between the first layer 11 and the cavity mold 60, and occurrence of molding defects in which the second resin material covers the outer periphery of the first layer 11 is suppressed.

As described above, the preform 10 in which the second layer 12 is laminated on the inner peripheral side of the first layer 11 is manufactured by the first injection-molding step and the second injection-molding step.

Thereafter, when the molds of second injection-molding unit 33 are opened, the rotary plate 37*a* of the conveyance mechanism 37 rotates by a predetermined angle, and the preform 10 held by the neck mold 37*b* is conveyed in a state that includes residual heat from the injection molding to the second temperature adjustment unit 34.

(Step S104: Second Temperature Adjustment Step)

Subsequently, the preform 10 is accommodated in the second temperature adjustment unit 34, and the temperature of the preform 10 is adjusted so as to be close to a temperature suitable for final blowing.

Thereafter, the rotary plate 37*a* of the conveyance mechanism 37 rotates by a predetermined angle, and the preform

10 after the temperature adjustment held in the neck mold 37*b* is conveyed to the blow-molding unit 35.

(Step S105: Blow-Molding Step)

Subsequently, in the blow-molding unit 35, the delamination container 20 is blow-molded.

First, the blow cavity mold is closed to accommodate the preform 10 in the mold space, and the air introduction member (blow core) is lowered, so that the air introduction member abuts on the neck portion 13 of the preform 10. Then, the stretching rod is lowered to press the bottom portion 15 of the preform 10 from the inner surface, and blow air is supplied from the air introduction member while performing longitudinal axis stretching as necessary, thereby laterally axially stretching the preform 10. As a result, the preform 10 is bulged and shaped so as to be in close contact with the mold space of the blow cavity mold, and is blow-molded in the delamination container 20. If the preform 10 is longer than the delamination container 20, the bottom mold is kept on standby at a lower position not in contact with the bottom portion 15 of the preform 10 before the closure of the blow cavity mold, and then is quickly raised to the molding position after the closure of the mold.

In the present embodiment, the air introduction hole 24 penetrating the first layer 11 and reaching the surface of the second layer 12 can be reliably formed in the delamination container 20 by blow-molding the preform 10 in which the concave portion 17 is formed in the bottom portion 15.

(Step S106: Container Taking-Out Step)

When the blow molding is completed, the blow cavity mold is opened. As a result, the delamination container 20 is movable from the blow-molding unit 35.

Subsequently, the rotary plate 37*a* of the conveyance mechanism 37 rotates by a predetermined angle, and the delamination container 20 is conveyed to the taking-out unit 36. In the taking-out unit 36, the neck portion 21 of the delamination container 20 is opened from the neck mold 37*b*, and the delamination container 20 is taken out from the blow-molding apparatus 30.

Thus, one cycle in the method for manufacturing the delamination container 20 is ended. Thereafter, with the rotary plate 37*a* of the conveyance mechanism 37 rotated by a predetermined angle, the foregoing steps of S101 to S106 described above are repeated. During the operation of the blow-molding apparatus 30, six sets of containers are manufactured in parallel with time differences in each step.

Due to the structure of the blow-molding apparatus 30, the respective durations of time of the first injection-molding step, the first temperature adjustment step, the second injection-molding step, the second temperature adjustment step, the blow-molding step, and the container taking-out step are the same. Similarly, the durations of time of conveyance between the steps are the same.

Hereinafter, advantageous effects of the blow-molding apparatus and the blow-molding method of the present embodiment will be described.

In the present embodiment, the first layer 11 (outer layer) of the preform 10 is molded in the first injection-molding step, and the second layer 12 (inner layer) is injection-molded inside the first layer 11 from the opening portion 16 of the first layer 11 in the second injection-molding step to manufacture the preform 10 having a two-layer structure. According to the present embodiment, the outer layer can be first formed of a resin material having a high melting point, and then the inner layer can be formed of a resin material having a melting point lower than that of the outer layer. That is, the injection molding of the inner layer is continuously performed while the outer layer includes residual heat from the injection molding, so that the preform 10 having a two-layer structure suitable for the specification of the delamination container 20 can be manufactured. In the present embodiment, since the preform 10 having a two-layer structure is released in a state where both the outer layer and the inner layer include residual heat from the injection molding, it is possible to obtain the preform 10 suitable for manufacturing the delamination container 20 by a hot parison blow-molding method.

In the present embodiment, the preform 10 having a two-layer structure is subjected to stretch blow molding in a state where the preform includes residual heat from the injection molding to manufacture the delamination container 20. Therefore, in the present embodiment, the delamination container 20 excellent in aesthetic appearance, physical property strength, and the like can be manufactured by the hot parison blow-molding method. As compared with the cold parison blow-molding, in the present embodiment, it is possible to eliminate the need to cool the produced preform 10 to near normal temperature, and also eliminate the need for the step of reheating the preform 10. Therefore, according to the present embodiment, a series of steps from the injection molding of the preform 10 to the blow molding of the delamination container 20 can be completed in a relatively short time, and the delamination container 20 can be manufactured in a shorter cycle.

In the present embodiment, the first temperature adjustment step is provided between the first injection-molding step and the second injection-molding step, and the opening portion 16 is formed in the first layer 11 in the first temperature adjustment step. Through the first temperature adjustment step, the cooling time in the mold can be shortened in the first injection-molding step, and the uneven temperature of the first layer 11 can be suppressed before the second layer 12 is molded. In addition, forming the opening portion 16 in the first layer 11 in the first temperature adjustment step eliminates the need to incorporate a mechanism for forming the opening portion 16 in the injection mold, so that the configuration of the injection molding apparatus can be simplified.

The present invention is not limited to the above embodiment, and various improvements and design changes may be made without departing from the gist of the present invention.

In relation to the above embodiment, the case where the delamination container is manufactured by the hot parison blow-molding method using a preform having a laminated structure has been described. However, the blow-molding method of the present invention is not limited to the production of the delamination container, and can also be applied to the production of other resin containers. For example, the present invention is also applicable to a case where a resin decorative container is manufactured by the hot parison blow-molding method in which a preform with a gradation or a color-coded pattern is molded by injection-molding of an outer layer and an inner layer in this order using resin materials of different colors.

In addition, the embodiments disclosed herein are to be considered as illustrative and not restrictive in all respects. The scope of the present invention is indicated not by the above description but by the claims, and it is intended that all modifications in meanings equivalent to the claims and within the scope of the claims are included in the scope of the present invention. For example, the number of molding stations of the blow-molding apparatus 30 may be appropriately increased or decreased (for example, the second temperature adjustment unit 34, the taking-out unit 36, and the like may be omitted to set the number of the molding stations to five). The mold units 50*a* and 50*b* may be mounted in an injection-molding apparatus that does not include the blow-molding unit 35 and may be used for the purpose of molding the preform for the delamination container.

What is claimed is:

1. A blow-molding apparatus comprising:

a first injection-molding unit configured to injection-mold a first layer of a bottomed cylindrical preform from a first resin material using a first injection-molding mold;

a temperature adjustment unit configured to accommodate the first layer manufactured in the first injection-molding unit in a temperature adjustment mold different from the first injection-molding mold, adjust a temperature of the first layer, the temperature adjustment unit including an axially moveable penetrating needle having a retracted position separated from a bottom portion of the first layer and an extended position extending through the bottom portion of the first layer during temperature adjustment to form an opening portion in a bottom portion of the first layer, the temperature adjustment unit further comprising:

an axially moveable core mold having a bottom with the penetrating needle facing downward;

an axially moveable lower mold having a cavity configured to receive the penetrating needle; and wherein when the axially moveable core mold is in a lower position and the axially moveable lower mold is in an upper position, the penetrating needle in present in the cavity, thereby forming the opening portion in a bottom portion of the first layer;

a second injection-molding unit configured to inject a second resin material from the opening portion formed in the first layer in the temperature adjustment mold to an inner peripheral side of the first layer to laminate a second layer on an inner periphery of the first layer, using a second injection-molding mold different from the temperature adjustment mold; and a blow-molding unit configured to blow-mold a multilayer preform obtained by the second injection-molding unit in a state where the multilayer preform includes residual heat from the injection-molding to manufacture a resin container.

2. The blow-molding apparatus according to claim 1, wherein the temperature adjustment mold includes:

a core mold that has an outer shape corresponding to an internal shape of the first layer and is insertable into the first layer;

a cavity mold that accommodates the first layer and adjusts a temperature of the first layer; and a movable member facing a bottom portion of the first layer, wherein any one of the core mold and the movable member has a perforating portion that forms an opening penetrating the bottom portion of the first layer.

3. The blow-molding apparatus according to claim 2, wherein:

the perforating portion is formed from a distal end of the core mold so as to protrude in an axial direction of the first layer, and the movable member includes a concave portion that receives the perforating portion.

4. The blow-molding apparatus according to claim 3, wherein the perforating portion is formed in the movable member so as to protrude in an axial direction of the core mold, and the core mold has a concave portion that receives the perforating portion.

5. The blow-molding apparatus of claim 1, wherein the first injection-molding unit comprises a cavity mold having a first projection portion configured to form a concave portion in the first layer, and the second injection-molding unit comprises a cavity mold having a second projection portion having a protrusion extending a distance greater than a thickness of the first layer and configured to penetrate the concave portion of the first layer and protrude to an inner peripheral side of the first layer and form an air introduction hole in the first layer.

6. A blow-molding apparatus comprising:

a first injection-molding unit configured to injection-mold a first layer of a bottomed cylindrical preform from a first resin material using a first injection-molding mold;

a temperature adjustment unit configured to accommodate the first layer manufactured in the first injection-molding unit in a temperature adjustment mold different from the first injection-molding mold, adjust a temperature of the first layer, the temperature adjustment unit including an axially moveable penetrating needle having a retracted position separated from a bottom portion of the first layer and an extended position extending through the bottom portion of the first layer during temperature adjustment to form an opening portion in a bottom portion of the first layer;

a second injection-molding unit configured to inject a second resin material from the opening portion formed in the first layer in the temperature adjustment mold to an inner peripheral side of the first layer to laminate a second layer on an inner periphery of the first layer, using a second injection-molding mold different from the temperature adjustment mold; and a blow-molding unit configured to blow-mold a multilayer preform obtained by the second injection-molding unit in a state where the multilayer preform includes residual heat from the injection-molding to manufacture a resin container the temperature adjustment unit further comprising:

an axially moveable lower mold having a bottom with the penetrating needle facing upward; and wherein when the axially moveable lower mold is in an upper position, the penetrating needle extends higher than the bottom portion of the first layer, thereby forming the opening portion in a bottom portion of the first layer.

* * * * *